No. 708,094.  
J. R. THOMAS.  
Patented Sept. 2, 1902.  
MACHINE FOR MAKING FIRE LIGHTER BLOCKS.  
(Application filed Jan. 9, 1902.)  
(No Model.)  
3 Sheets—Sheet 2.
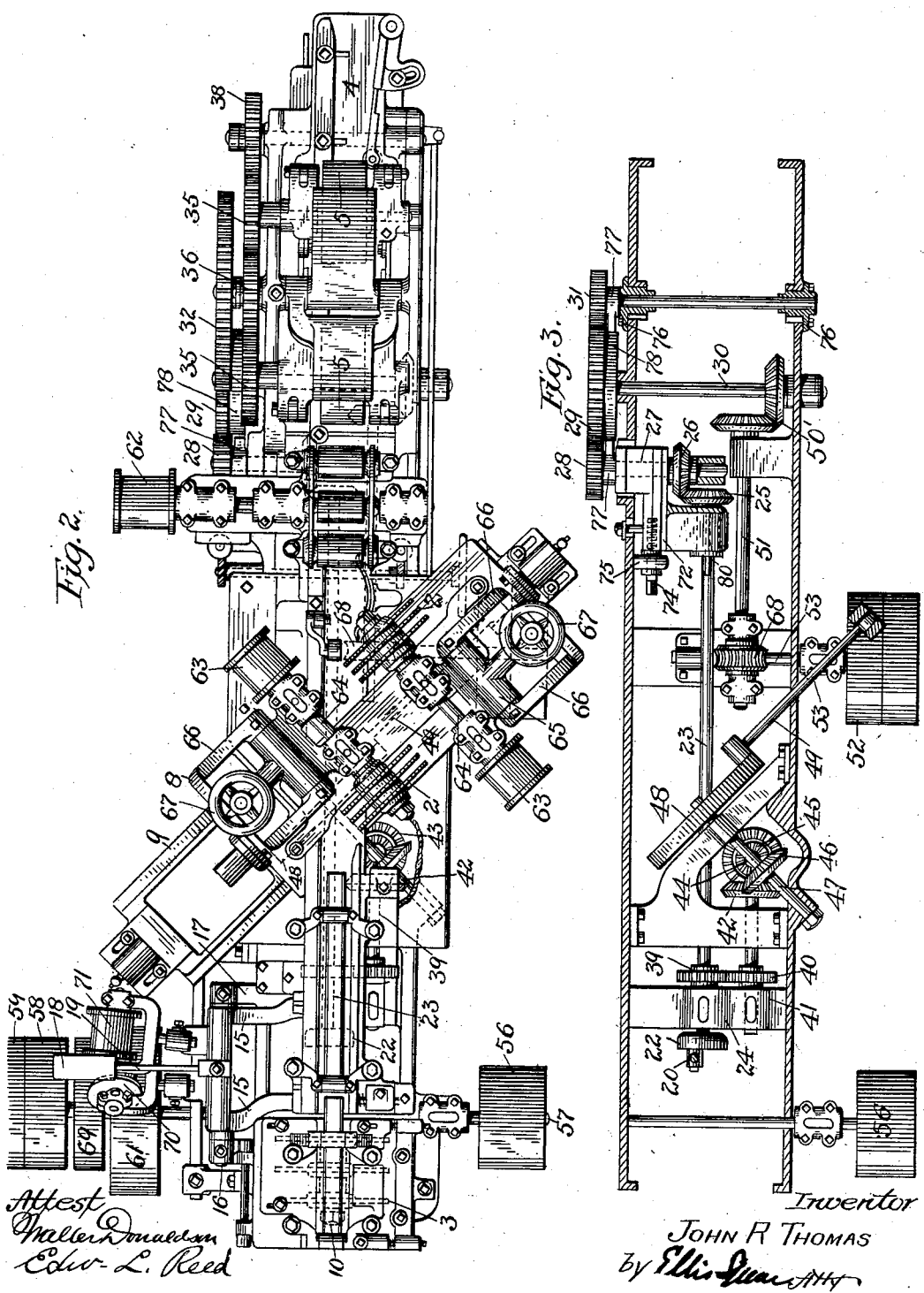
Inventor  
JOHN R THOMAS No. 708,094. Patented Sept. 2, 1902.
J. R. THOMAS.
MACHINE FOR MAKING FIRE LIGHTER BLOCKS.
(Application filed Jan. 9, 1902.)
(No Model.) 3 Sheets—Sheet 3.

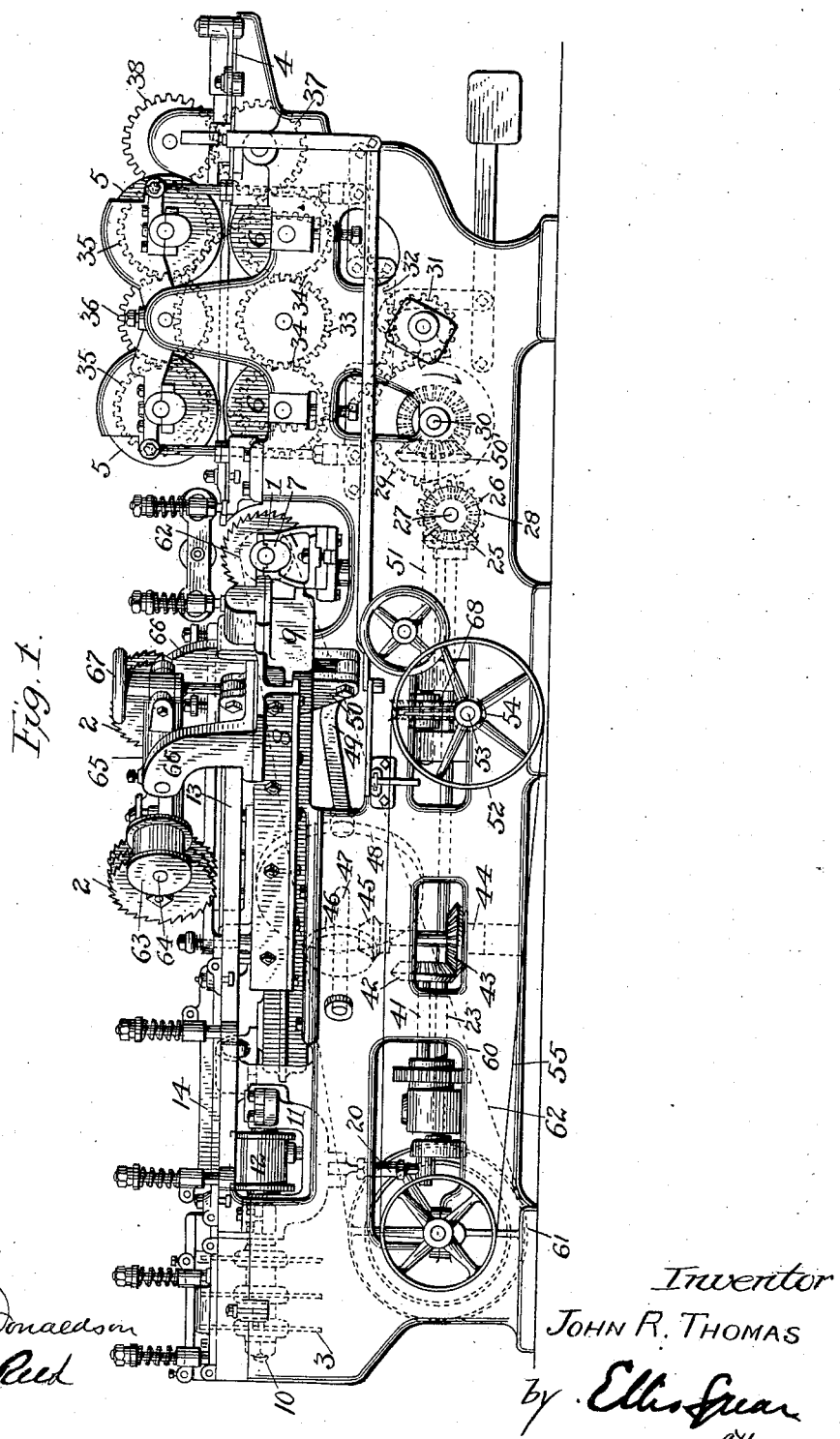

Attest
Walter Donaldson
Edw. L. Reed

Inventor
JOHN R. THOMAS
by Ellis Spear
Atty

THE NORRIS PETERS CO., PHOTO-LITHO., WASHINGTON, D. C.

UNITED STATES PATENT OFFICE.

JOHN RICKARD THOMAS, OF CINCINNATI, OHIO, ASSIGNOR TO POLLARD & METCALFE, LIMITED, OF SILSDEN, ENGLAND.

MACHINE FOR MAKING FIRE-LIGHTER BLOCKS.

SPECIFICATION forming part of Letters Patent No. 708,094, dated September 2, 1902.

Application filed January 9, 1902. Serial No. 89,042. (No model.)

*To all whom it may concern:*

Be it known that I, JOHN RICKARD THOMAS, a citizen of the United States, residing at Cincinnati, Hamilton county, Ohio, have invented certain new and useful Improvements in Machines for Making Fire-Lighter Blocks, of which the following is a specification.

My invention relates to machinery for making fire-lighters, and is an improvement upon the form of machine shown in the application for Letters Patent of the United States filed by Edwin Pollard and John R. Thomas July 27, 1901, Serial No. 69,965.

Figure 4:
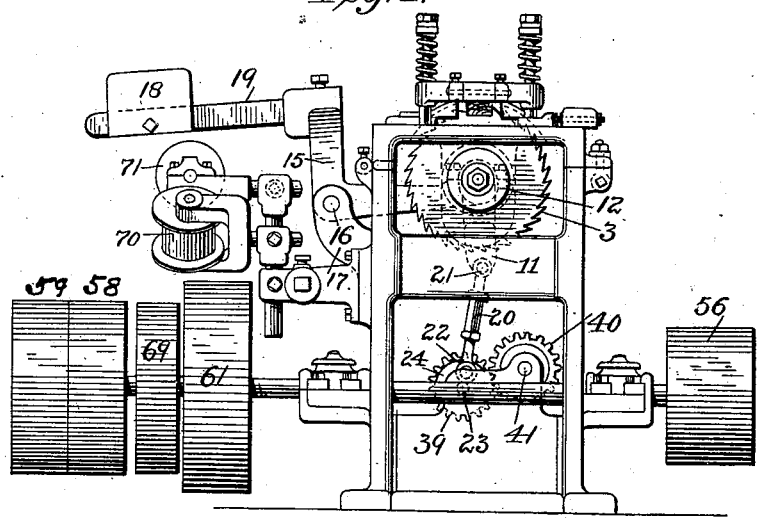
Figure 5:
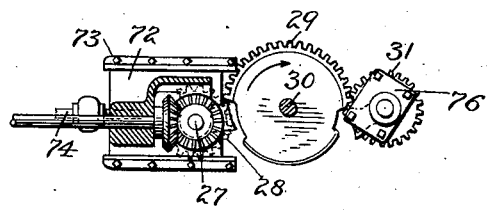

In the accompanying drawings, Figure 1 is a side view of the machine; Fig. 2, a plan view; Fig. 3, a plan view of driving connections for the several parts. Fig. 4 is an end view of the machine. Fig. 5 is a view of a detail.

As the present machine in its general plan and arrangement of parts is substantially the same as that shown in the application above referred to, it is not thought necessary to describe herein the detail features except in so far as they relate to the present improvement. Like the former machine the present one is designed to produce kindling-blocks provided with grooves on opposite sides crossing each other, so as to provide a series of ribs on each face, with ventilating or draft openings between them.

The machine includes a gang of rotary saws 1, arranged to cut a series of grooves longitudinally of the under face of the stock, a second gang of rotary saws 2 for cutting a series of diagonal grooves on the upper face of the stock, and a saw or gang of saws 3 for severing the grooved stock transversely to complete the formation of the blocks. The two gangs of saws are arranged so that they each cut into or across the same intermediate plane to form the ventilating-openings at the points of crossing of the grooves.

The stock is fed into the machine at the feeding-in table 4 and passes between two pairs of upper and lower feed-rollers 5 6, which are rotated positively and intermittingly, as will be hereinafter described, to force the stock step by step over the grooving-saws 1. These saws are continuously rotated in fixed bearings 7, and they groove the length of stock fed thereto at each feeding action of the feed-rollers 5 and 6, and then when the stock is at rest the said saws simply run idly in the grooves just formed. The diagonal saws 2, which also constantly rotate, now begin their work, and for this purpose the carriage 8, upon which they are supported, is given its movement along the guideways 9, which are fixed to the frame and are inclined in relation to the longitudinal axis of the machine, and thus the saws 2 are made to cut the diagonal grooves on the upper face of the stock, this action taking place, as just stated, while the first gang of saws are running idly in the grooves which they have just cut. By the intermittent feed and the timing of the traversing movement of the upper gang of saws to take place when the stock is at rest it will be noticed that only one gang is operating upon the stock at the same time, and the power necessary to drive the machine is much less than would be the case were both gangs of grooving-saws cutting at the same time. In the present arrangement while both gangs of saws rotate constantly their action upon the stock takes place alternately, the action of one, however, following the other so closely as to keep up a practically continuous formation of the grooves.

In the present invention I have aimed to reduce the length of the machine and to generally improve the arrangement and action of the cutting-off saws. For this purpose the cutting-off saws while rotating constantly are given simply a rising-and-falling movement and have no travel longitudinally of the machine, as in the application referred to. This not only serves to reduce the length of the machine, but renders the action of the cutting-off saws more steady and certain and enables the machine to be driven at a higher rate of speed, the only movement which the cutting-off saws perform being that of rising and falling. The arbor 10 of these saws is journaled in a forked frame 11 and carries a pulley 12 to receive a band by which the arbor, with the saws, is constantly driven. The saws operate upwardly against the stock in severing it into blocks, the stock passing from the saws 1 over the table 13, beneath the saws 2, and thence over the table at 14 and over the cutting-off saws. The frame of the cutting-off saws is provided with a laterally-extending arm or arms 15, pivoted upon a rod 16, journaled in the bearings 17 of the frame. The saw and its frame are counterbalanced by a weight 18 on an arm 19, connected with the arm 15. The frame is raised and lowered to cut and cease cutting by a pitman 20, pivoted to the forked frame at 21 and connected to a crank-disk 22 on a shaft 23, journaled in bearings 24 of the frame. This shaft is driven through beveled gearing 25 26 from a shaft 27, which is suitably journaled in the frame and is provided with a pinion 28 to be driven intermittingly through a mutilated gear 29, fixed on a shaft 30, bearing in suitable boxes on the frame. Through this train of drive mechanism it will be seen that the cutting-off saws are raised to sever the grooved stock into blocks, and by means of the mutilated gear the severing action is rendered intermittent. The same mutilated gear also controls the intermittent feed of the stock, and for this purpose it drives at intervals a gear 31, dotted line, Fig. 1, located on the opposite side of the mutilated gear from the gear 28. This gear 31 in turn drives a gear 32, which has on its shaft a gear 33, meshing with gears 34 on the shafts of the lower feed-rollers. The upper feed-rollers are geared together through gears 35 and an intermediate gear 36, and this upper gearing is driven from the driving-gearing of the lower rollers through the gears 37 38, journaled in the frame. It will be seen from Fig. 1 that the mutilated gear traveling in the direction of the arrow will drive first the feed-roll train, and then when the feeding action has been completed and the stock is at rest the mutilated gear will operate the train of driving connections leading to the cutting-off saws to raise them to sever the stock into completed blocks. Simultaneously with the cutting-off action the diagonal saws are traversed across the stock to groove the upper face thereof, and for doing this motion is communicated from the shaft 23 through gearing 39 40 to a shaft 41, turning in suitable bearings and having a bevel-gear 42 thereon meshing with a similar gear 43 on an upright shaft 44, suitably journaled and having a beveled pinion 45, meshing with a bevel-gear 46 on a shaft 47, journaled in the frame and having a crank-disk 48 thereon connected by a pitman 49 with ears 50, depending from the diagonal-saw carriage 8, so that after the mutilated gear has ceased to drive the feed-rollers and the under grooving-saws 1 are running idly the said gear will cause, through the described connections, both the cutting-off saws and the diagonal saws to act on the stock which is now at rest so as to diagonally groove the upper face of the stock and to sever from that portion which has been previously and completely grooved the lengths sufficient to form the fire-lighting blocks. The cutting-off saws require little power to operate them as compared with the grooving-saws, which cut grooves about one-half an inch in width, and the manner of operating them when the stock is at rest enables me to shorten the machine, avoids complication of parts, and gives more satisfactory results in the cutting action. The cutting-off actions can succeed each other more rapidly in the present arrangement, as the saws do not have to travel back and forth during the cutting. I prefer to use a gang of these saws by which three blocks are simultaneously cut off at each action.

The shaft 30 of the mutilated gear is driven through bevel-gearing 50' from a shaft 51, suitably journaled in the frame and driven from a pulley 52 on a shaft 53, journaled in the frame and having a worm 54 thereon engaging a worm-wheel 68 on the said shaft 51. The pulley is driven through a band 55 from a pulley 56 on a drive-shaft 57. This shaft carries the fast and loose pulleys 58 59, to which the belt from the motor is applied.

The longitudinal grooving-saws are rotated through a band 60, passing over pulleys 61 62, the former being on the main drive-shaft. The diagonal saws are driven through bands passing about the pulleys 63 on their shafts 64. These shafts have their bearings in levers 65, pivoted in the standards 66, extending up from the carriage 8, and the saws are adjusted vertically by hand-wheels 67, substantially as described in the application above referred to. The pulley 12 of the cutting-off saws is driven through a belt passing over a pulley 69 on the main shaft and over directing-pulleys 70 71.

In order to provide for varying the feed and the timing of the cut-off actions, the gearing 29, 28, and 31 may be changed, and for this purpose the shaft 27 of the gear 28, which drives the cut-off saws, is journaled in an adjustable bearing-frame 72, arranged to slide in ways 73, fixed to the frame and adjusted by a screw-shaft 74, journaled in the frame at 75. The frame also affords a bearing for the shaft 23, to which the beveled gear 25 is splined at 80, Fig. 3. The shaft 27 may be adjusted toward or from the shaft 30 of the mutilated gear in making the change in the gearing. The shaft of the gear 31 is journaled in boxes 76, the bearing being to one side of the box, so that by turning this half-way around the bearing may be brought nearer to the shaft of the mutilated gear. Suitable locking-dogs 77 may be used with each of the gears 28 and 31 to coact with a rim 78 on the mutilated gear, whereby when either the feeding mechanism or the cut-off saws is not in operation the same may be locked against displacement.

I claim—

1. In combination, a saw or gang of saws for grooving the stock longitudinally, a second saw or gang of saws for grooving the stock transversely, a cut-off saw for severing the grooved stock into blocks, feeding means for the stock, a mutilated gear, means for driving the same and a pair of gears driven alternately by the mutilated gear, connections from one of said gears to the feeding mechanism and connections from the other of said gears to the cut-off saws, substantially as described.

2. In combination, a saw or gang of saws for grooving the stock longitudinally, a second saw or gang of saws for grooving the stock transversely, a cut-off saw for severing the grooved stock into blocks, feeding means for the stock, a mutilated gear, means for driving the same and a pair of gears driven alternately by the mutilated gear, connections from one of said gears to the feeding mechanism, connections from the other of said gears to the cut-off saws, and means for driving the transverse saws from the connections leading to the cut-off saws, substantially as described.

3. In combination, a saw or saws for grooving the stock longitudinally, a saw or saws for grooving it transversely, a cut-off saw for severing the grooved stock into blocks, feeding mechanism for the stock, a mutilated gear, means for driving the same, a pair of gears, connections therefrom for driving respectively the feeding means and the cut-off saws alternately and means whereby the shafts of said gears may be adjusted to provide change-gearing, substantially as described.

4. In combination with intermittent feeding means, longitudinal saws with means for driving the same, transverse and cutting-off saws, a mutilated gear, a connection therefrom to the intermittent feeding means to operate the same, connections between the mutilated gear and the transverse and cutting-off saws whereby the same are operated against the stock intermittingly, said means including a gear meshing with the mutilated gear, beveled gearing, a shaft to which one member of the beveled gearing is splined and an adjustable bracket for adjusting the splined gear together with its shaft toward and from the mutilated gear, substantially as described.

In testimony whereof I affix my signature in presence of two witnesses.

JOHN RICKARD THOMAS.

Witnesses:
WILLIAM S. WILLIAMS,
PARKE S. JOHNSON.